United States Patent [19]

Do et al.

[11] Patent Number: 5,269,566
[45] Date of Patent: Dec. 14, 1993

[54] HYDRAULIC FITTING LOCKS

[75] Inventors: Tai H. Do, Huntington Beach; Thomas E. Harbin, Westminster; Wilhelm F. Schepergerdes, El Toro; Marvin P. Reece, Dana Point; Daniel J. McCorkle, Irvine, all of Calif.

[73] Assignee: VSI Corporation, Calif.

[21] Appl. No.: 430,317

[22] Filed: Oct. 31, 1989

Related U.S. Application Data

[63] Continuation-in-part of Ser. No. 32,700, Apr. 1, 1987, Pat. No. 4,877,271.

[51] Int. Cl.$^5$ .............................................. F16L 35/00
[52] U.S. Cl. .................................. 285/39; 285/92; 285/220; 285/305
[58] Field of Search .................. 285/92, 84, 85, 86, 285/39, 220, 305

[56] References Cited

U.S. PATENT DOCUMENTS

| | | | |
|---|---|---|---|
| 408,320 | 8/1889 | Powell | 285/86 X |
| 1,195,165 | 8/1916 | Baker. | |
| 2,208,353 | 7/1940 | Woolley et al. | |
| 2,460,032 | 1/1949 | Risley. | |
| 2,497,441 | 2/1950 | Detweiler. | |
| 2,728,895 | 12/1955 | Quackenbush et al. | 285/85 X |
| 2,971,781 | 2/1961 | Torres. | |
| 3,142,498 | 7/1964 | Press. | |
| 3,223,438 | 12/1965 | De Cenzo. | |
| 3,259,162 | 7/1966 | Rosan. | |
| 3,395,934 | 8/1968 | Rosan et al. | |
| 3,404,415 | 10/1968 | Rosan et al. | |
| 3,495,853 | 2/1970 | Furrer. | |
| 3,695,644 | 10/1972 | Goldberg. | |
| 3,702,707 | 11/1972 | Rosan, Sr. | |
| 3,707,707 | 11/1972 | Rosan | 285/92 X |
| 3,851,901 | 12/1974 | Sills. | |
| 3,993,331 | 11/1976 | Schwarz. | |
| 4,230,349 | 10/1980 | Normark. | |
| 4,261,599 | 4/1981 | Streed. | |
| 4,343,496 | 8/1982 | Petranto. | |
| 4,568,228 | 2/1986 | Rosan, Jr. | |
| 4,666,190 | 5/1987 | Yamabe et al. | |
| 4,697,828 | 10/1987 | Chou. | |
| 4,722,560 | 2/1988 | Guest. | |

FOREIGN PATENT DOCUMENTS

| | | |
|---|---|---|
| 0286568 | 10/1988 | European Pat. Off. |
| 520755 | 3/1931 | Fed. Rep. of Germany. |
| 941521 | 4/1956 | Fed. Rep. of Germany. |
| 2213901 | 1/1974 | Fed. Rep. of Germany. |
| 3130331 | 5/1982 | Fed. Rep. of Germany. |
| 917287 | 9/1946 | France. |
| 2172310 | 9/1973 | France. |
| 3170 | of 1914 | United Kingdom ............... 285/261 |
| 447502 | 5/1936 | United Kingdom ............... 285/85 |
| 624386 | 7/1949 | United Kingdom. |

OTHER PUBLICATIONS

"Engineering Application Manual AM-19 Inverted MS Boss Seal Fitting Design" *Weatherhead.*

Primary Examiner—Dave W. Arola
Attorney, Agent, or Firm—Pretty, Schroeder, Brueggemann & Clark

[57] ABSTRACT

A fluid connector and lock combination is described for connecting a tube to a base element. A relatively fixed, threaded base element has a passageway for passing fluid. A threaded mounting connector for surrounding the circumference of a portion of a tube is provided and which also mounts the tube to the relatively fixed, threaded base element through threaded engagement. The connector maintains a seal between the tube and a corresponding surface in the base element when the connector is sufficiently threaded to a sealed position relative to the base element to prevent leakage of fluid across the seal. A linkage is provided between the connector and the base element for preventing unthreading of the connector from the sealed position relative to the base element. The linkage includes a first portion which is linked to the connector and a second portion which engages slidingly in an axial direction the base element for preventing relative rotation between the connector and the base element.

20 Claims, 7 Drawing Sheets

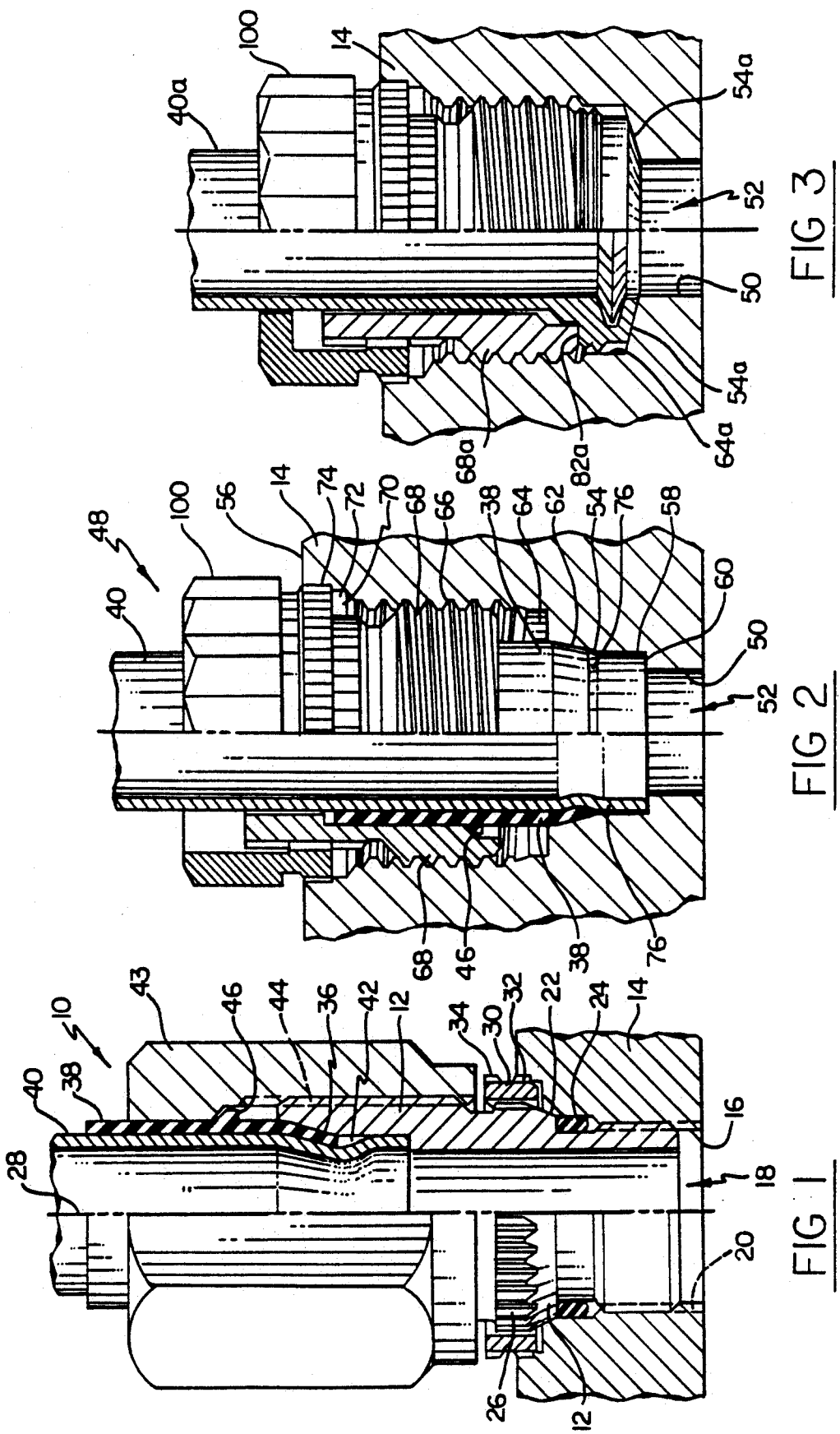

HYDRAULIC FITTING LOCKS

RELATED APPLICATIONS

This is a continuation-in-part of Ser. No. 032,700, filed Apr. 1, 1987, now U.S. Pat. No. 4,877,271.

BACKGROUND

1. Field of the Invention

The present invention relates to hydraulic and pneumatic connectors, and more specifically to fluid connectors wherein a coupling nut or other fastener for a hydraulic tube is fixed to a base element so that it cannot back off due to vibration or other external forces.

2. Related Art

Fittings for providing a leak-proof attachment between a hydraulic or other fluid conducting tube and associated hardware such as actuators, manifolds, etc., are well known. Connectors and adapters may also serve the same function. One type of well known fitting is that shown in the Rosan, Sr. Patent, U.S. Pat. No. 3,702,707. A modified form of the Rosan fitting is shown in FIG. 1 herein and labeled as prior art.

The fitting combination 10 shown in FIG. 1 includes a fitting 12 threaded into a parent or base material 14. The parent material may be steel, aluminum or any other material forming the particular housing or hardware to which a fluid connection is to be made. For example, the parent material may be the wall of an actuator, manifold, etc. A cavity 16 defines a passageway 18 through which the fluid passes. The fluid may be hydraulic or pneumatic and may be under pressure. Pressures may be between 3,000 and 8,000 psi for example. The cavity 16 may be threaded with internal threads shown schematically at 20. The passageway may be threaded partially or entirely along its length. Mating threads on the fitting 12 engage the threads in the passageway.

The fitting forms a first primary seal 22 with the parent material 14. The first primary seal 22 is formed between a frusto-conical section in the parent material and a converging surface on the fitting 12. An elastomeric O-ring 24 serves as a secondary seal. The fitting includes serrations 26 extending in a direction parallel to the central axis 28 of the fitting combination and is held in engagement with the parent material 14 by a lockring 30. The lockring has internal serrations that mate with the external serrations 26 on the fitting and engages the parent material with external serrations 32 on its lower part and mating serrations formed in the parent material in a prebroached counterbore. The lockring 30 prevents rotation of the fitting relative to the parent material, thereby preventing the fitting from backing out of the parent material.

Upper serrations 34 formed in the upper portion of the lockring are used together with an appropriate tool to torque the fitting into the parent material.

A second primary seal 36 is formed between an upper frusto-conical section of the fitting 12 and a ferule or sleeve 38. The sleeve surrounds a portion of the end of a tube 40. A crimp 42 in the lower portion of the tube is partially formed during setting of the sleeve and is fully set when the sleeve 38 is cammed inward by the first frusto-conical portion of the fitting. The contact between the fitting, the sleeve and the tube forms the second primary seal.

The second primary seal is formed by torquing a B-nut 43 so that the threads 44 advance the B-nut downward over the fitting 12. Engagement of an angled surface on the inside of the B-nut with a correspondingly sloped flanged portion 46 extending outwardly from the sleeve causes the sleeve and tube to also move downward and into contact with the frusto-conical portion of the fitting.

The prior fitting combination is a multiple-piece arrangement and requires a series of steps to form a connection. The fitting must be threaded into the parent material and the lockring set into the prebroached parent material. Then, the tube, sleeve and B-nut are placed over the top of the fitting and tightened down. This provides a fitting with two primary seals, one between the fitting and the parent material and the other between the fitting and the sleeve. A secondary seal between the fitting and the parent material is provided with the O-ring. The fitting combination does not have a very low profile since the fitting extends substantially above the surface of the parent material and the B-nut is entirely exposed above the parent material. Furthermore, a lockwire is necessary to fix the B-nut relative to the fitting so that the B-nut does not back off the fitting due to external forces such as vibration. The lockwire can be passed through holes formed in the B-nut and secured to a boss on the parent material.

It is common practice to routinely replace the O-rings 24. This be done during an overhaul or cleaning of the hydraulic fittings. When this is done, the B-nut is loosened after removing the lockwire, and the tube and sleeve removed from the fitting. The fitting is then removed by lifting out the lockring with a lockring removal tool and unthreading the fitting. All parts are then cleaned and the O-ring replaced. If the tube, sleeve and B-nut only are to be removed, the fitting remains in the parent material. This may occur when the entire component is removed entirely from all hydraulic lines and serviced. During servicing, it is possible that the exposed fitting could be damaged. This could damage both the fitting and the parent material.

Similar characteristics are also present in other types of hydraulic fittings.

Use of a lockwire to fix the B-nut relative to the fitting is cumbersome and requires drilling a hole in one or more corners of the B-nut and finding a boss or tiedown location on the parent material to keep the B-nut from backing off. The lockwire is not a positive mechanical locking device and installation of lockwires may be subject to inconsistent installation techniques.

There is a need for an easy and reliable method and apparatus for positively locking the B-nut or other connector to the parent material or other base element which is fixed relative to the connector. Such an apparatus would provide a positive lock for maintaining the required leak-free fluid connection and provide a consistent method for locking the connector to the base element.

SUMMARY OF THE INVENTION

A hydraulic connector and lock combination according to the present invention is easy to use and prevents the hydraulic tubing connector from backing off from its connection and loosening so that the connection made with the hydraulic tube fails. The present invention provides an efficient and reliable method for achieving this result. Specifically, a relatively fixed base element has a passageway for passing fluid. Mounting means mounts the tube to the relatively fixed base element through engagement therewith and includes a passageway for passing fluid between the tube and the base element. The mounting means maintains a seal between the tube and a corresponding surface in the base element when the mounting means is sufficiently advanced to a sealed position relative to the base element to prevent leakage of fluid across the seal. Means are provided extending between the mounting means and the base element for preventing withdrawal of the mounting means from the sealed position relative to the base element, wherein the preventing means includes a first portion which engages the mounting means and a second portion which engages the base element for preventing relative movement between the mounting means and the base element. With this combination, the mounting means is prevented from withdrawal from the base element, which in turn prevents the seal made between the tube and the base element from being broken. Problems due to external forces such as vibration or changes in temperature, or difficulties in assembly, are minimized relative to current connections.

In a preferred form of the invention, the base element is a standard fitting threaded into a parent material. The hydraulic tube is mounted to the fitting in the conventional manner and a B-nut threaded onto the fitting to form the seal between the hydraulic tube and the fitting. A sleeve having a shape conforming to the outer configuration of the B-nut slides over the B-nut down to the parent material so that the sleeve engages both the B-nut and the lockring embedded in the parent material. The sleeve, engaging the lockring, prevents rotation of the B-nut and therefore keeps the B-nut from backing off the fitting.

Axial movement of the sleeve may be prevented by inserting a clip wire through part of the sleeve and underneath the B-nut so that the bottom of the B-nut serves to block axial movement of the sleeve. Alternatively, the lockring may include an eccentric lobe extending radially away from the lockring and include a groove or hole to be engaged by a projection or tang on the sleeve. The tang preferably includes an inwardly extending lip or ridge for engaging the underside of the lobe. The lip prevents axial movement of the sleeve under normal operating conditions so that the sleeve cannot disengage from the lockring. In another preferred embodiment, the lockring can have a plurality of lobes.

BRIEF DESCRIPTION OF THE DRAWINGS

In the drawings:

FIG. 1 is an elevation and partial longitudinal cross sectional view of a prior fluid fitting combination for connecting a fluid tube to a housing;

FIG. 2 is an elevation and partial longitudinal sectional view of a fluid connector according to an embodiment of the present invention with a connection between a flareless tube and a housing material;

FIG. 3 is an elevation and partial longitudinal sectional view of a fluid connector according to an embodiment of the invention with a connection between a dynamic beam tube and a housing material;

DETAILED DESCRIPTION OF THE PREFERRED EMBODIMENT

Figure 4:
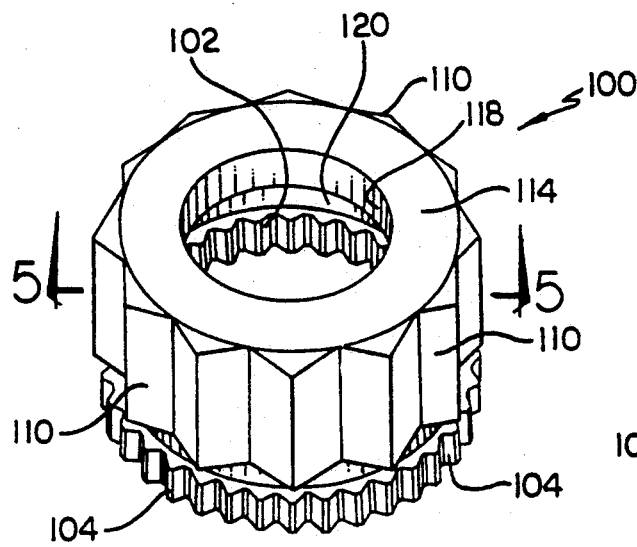
FIG. 4 is a perspective view of a lockring for use in a connector for making a connection as shown in FIGS. 2 and 3.

In accordance with the present invention, a hydraulic connector and lock combination is disclosed which substantially prevents the connector for the hydraulic tube from withdrawing under normal operating conditions and thereby threatening the integrity of the seal formed between the hydraulic tube and the base element. The hydraulic connector and lock combination is easy to use and provides a positive lock for the connector. A fluid connection 48, as shown in FIG. 2, connects the tube 40 to the parent material 14. The parent material 14 constitutes the base element to which the hydraulic tube is to be connected. (Those elements substantially the same in structure and function as the elements in FIG. 1 are identically numbered). The tube carries hydraulic or pneumatic fluid and may be rated for withstanding pressures of up to an 8,000 psi operating system. The tube maintains a fluid connection between a remote device and a component such as an actuator or manifold of which the parent material is a part.

A first wall 50 in the parent material defines a flow passage 52 having a first diameter in the parent material for passing fluid between the tube 40 and the hydraulic or pneumatic component. (It will be assumed hereafter that the fluid connection is to be made for a hydraulic fluid line. However, it is to be understood that the connector may be used for pneumatic or other similar connections.) The flow passage 52 is preferably circular in transverse cross-section.

A second wall 54 is formed in the parent material and extends between the first wall and a point below the surface 56 of the parent material. The second wall is the location of the primary and only seal, as described more fully below. The second wall includes a first counterbore 58 in which the end of the tube 40 is positioned. The frusto-conical section includes a transversely extending shoulder 60 against which the end of the tube abuts. The inside diameter of the counterbore is greater than the inside diameter of the passageway 52, for example by an amount approximately equal to twice the wall thickness of the tube 40.

A first frusto-conical section 62 diverges away from the first counterbore 58 and forms the remainder of the second wall 54. The frusto-conical section serves as the sealing surface against which the sleeve 38 contacts. The second wall is preferably circular in transverse cross-section.

A second counterbore 64 extends outwardly toward the surface 56 from the second wall 54. The second counterbore includes engagement means in the form of internal threads 66 in a circumferential wall of the counterbore between the second wall and a point below the surface of the parent material. The threads engage an insert 68, to be described more fully below.

The threads extend upwardly to a third counterbore 70 having a cylindrical wall 72. The top portion of the cylindrical wall 72 is prebroached to form serrations 74 for engaging mating serrations on a lockring, to be described more fully below. The serrations are formed in the cylindrical wall so that the radially inward-most portions of the serrations are flush with the remainder of the cylindrical wall 72.

The tube has an end portion 76 to be ultimately positioned adjacent the second wall 54 such that the tube is sealed in the parent material between the first wall 50 and the threads 66. In the embodiment shown in FIG. 2, the seal is preferably formed at the frusto-conical section 62 in the second wall 54. The actual seal is formed between the wall of the frusto-conical section 62 and the sleeve 38. A seal is also provided between the sleeve and tubing as occurred with previous connections and fittings. The end portion 76 of the tube 40 and the sleeve 38 surrounding the end of the tube are substantially identical to those used with the prior connectors and fittings. Therefore, there is only one primary seal in the connection and it is formed below the surface 56 of the parent material and below the threads 66 engaging the insert means. The recessed seal makes it less subject to vibrational stresses and makes the seal surface less subject to damage when the connector is not in place. The recessed seal also allows a lower profile connection.

Insert means in the form of an insert 68 engages the threads 66 for maintaining the tube in a sealed condition. The insert surrounds the circumference of a portion of the tube and mounts the tube to the relatively fixed, threaded parent material. In the embodiment shown in FIG. 2, the insert 68 includes threads complementary to the threads 66 formed in the parent material. The insert maintains both the tube and the sleeve in their final, sealed condition in the parent material when the insert is tightened down the required amount and locked in place by suitable means, such as the lockring to be described below, to prevent leakage of fluid across the seal.

Figure 6:
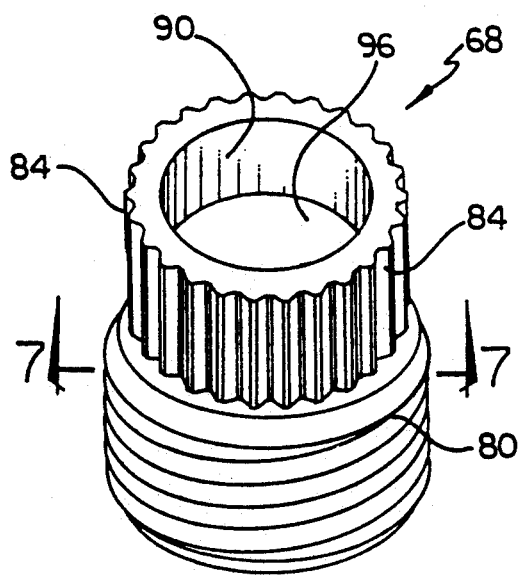
FIG. 6 is a perspective view of an insert for a connector for making a fluid connection between a fluid tube and housing materials such as is shown in FIGS. 2 and 3.
Figure 7:
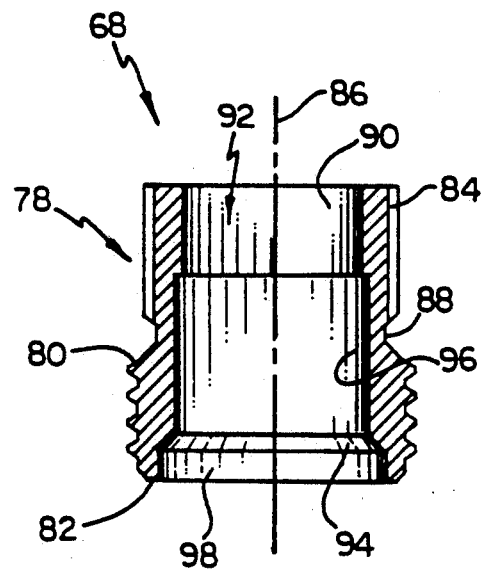
FIG. 7 is a longitudinal sectional view of the insert taken along lines 7—7 of FIG. 6.

Referring to FIGS. 6 and 7, the insert 68 has a generally annular body 78 with external threads 80 on a first portion of the body mating with the internal threads 66 in the parent material. The external threads preferably extend over approximately the bottom half of the annular body 78 from a bottom rim 82 upwardly. The insert further includes serrations 84 on a second portion of the body for engaging a second member, such as a lockring to be described more fully below. In the embodiment shown in FIGS. 6 and 7, the serrations preferably extend over the top half of the body, in a direction parallel to a central axis 86. An annular groove or undercut 88 extends circumferentially around the annular member at an approximate middle of the insert between the external threads and the serrations. The undercut allows expulsion of debris and burrs during formation of the threads and serrations.

The insert includes a first substantially uniform cylindrical surface 90 on an interior portion 92 of the insert and defines a bore for surrounding the tube 40 (FIG. 2). A second surface 94 is formed on the interior surface of the first portion of the insert. The second surface 94 is separate from the first cylindrical surface and faces at least partly in a direction away from the first surface. In the embodiment shown in FIG. 7, the second surface is a frusto-conical surface diverging outwardly and downwardly, as viewed in FIG. 7, from a first counterbore 96 in the insert to a second counterbore 98 in the insert. The second surface engages and mates with the sloped surface on the external flanged portion 46 on the sleeve. The angle of divergence of the frusto-conical section substantially conforms to the angle of the flanged portion 46 just as the angle on the interior surface of the B-nut 43 on conventional fittings conformed to the sloped surface on the flanged portion.

The first counterbore 96 in the insert extends from the first cylindrical surface 90 to the second surface 94. The first counterbore extends from an approximate mid-portion of the serrated part of the insert to an approximate mid-portion of the threaded part of the insert. The inside diameter of the first counterbore is dimensioned so as to clear the outside surface of the sleeve 38. The second counterbore 98 in the insert extending downwardly from the frusto-conical surface 94 to the bottom rim 82 is dimensioned so as to clear the outside edge of the flanged portion 46 on the sleeve.

Figure 5:
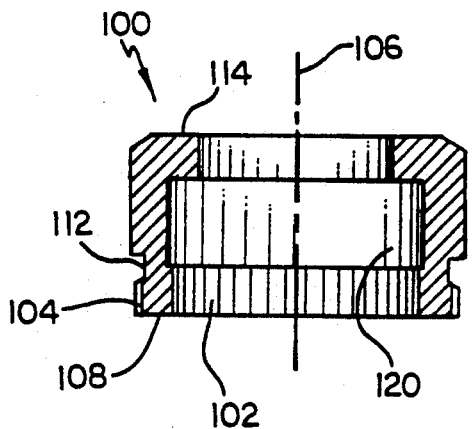
FIG. 5 is a longitudinal sectional view of the lockring taken along lines 5—5 of FIG. 4.

A lockring 100, shown in FIGS. 4 and 5, is axially moveable relative to the insert. The lockring includes serrations 102 on a first or interior portion of the lockring for engaging the serrations 84 on the insert. Interengagement of the serrations 84 and 102 prevents relative rotational movement between the lockring and the insert. The lockring ultimately prevents unthreading of the insert relative to the parent material.

External serrations 104 are formed on a second portion or external surface of the lockring for engaging the parent material 14 when the insert is threaded into the parent material. Interengagement of the serrations 104 and the parent material prevents relative rotation between the insert and the patent material. The internal and external serrations are formed on a lower portion of the lockring and extend along a direction substantially parallel to a central axis 106, substantially coaxial with the central axis 86 of the insert. In the preferred embodiment, the internal serrations 102 on the lockring are dimensioned relative to the external serrations 84 on the insert such that there is frictional engagement or an interference fit therebetween, so that the lockring does not slide axially relative to the insert without application of an external force. This keeps the lockring positioned axially relative to the insert at its original position so that the insert can be torqued into the parent material by turning the lockring without having the lockring contact the surface 56 of the parent material prematurely. As shown in FIG. 2, the external serrations on the insert are formed such that the lockring can slide axially along the insert a substantial distance toward the threads 80 on the insert. A flat bottom rim 108 on the lockring extends substantially in a plane transverse to the central axis 106 between the internal serrations and the external serrations. Both the internal and external serrations extend axially upward away from the bottom rim 108.

The lockring further includes hex points 110 on the approximately upper two-thirds of the outer circumferential surface of the lockring to be engaged by an appropriately formed tool for rotating the lockring about the central axis 106. In the embodiment shown in FIG. 4, the lockring includes twelve points. Therefore, the lockring can be rotated using a standard wrench. In an alternate embodiment (not shown), two flats may be formed on the lockring by omitting two oppositely disposed hex points. This forms a 10-point engagement means, wherein five of the points are separated from the other five points by the two flats. This would allow use of other standard wrenches for turning the lockring.

A groove or undercut 112 is formed in the outer circumference of the lockring between the hex points 110 and the external serrations 104. The groove facilitates formation of the serrations and hex points and also provides means with which a lockring removal tool can engage to slide the lockring axially away from the threads 80 on the insert 68. Such a groove is also shown in the lockring 30 of the prior art device shown in FIG. 1.

The hex points extend upwardly to a substantially flat top surface 114 on the lockring. The top surface 114 extends substantially transverse to the central axis 106. The top surface forms part of an inwardly extending lip or flange 116 extending radially inwardly toward the central axis 106 from the wall of the lockring. The flange defines a substantially cylindrical opening 118 in the top of the lockring dimensioned to surround the tubing 40. The flange 116 and the internal serrations 102 define the top and bottom, respectively, of an internal cylindrical surface 120 of the lockring.

The lockring can be formed using powder metallurgy technology. This will allow relatively easy formation of the flange 116. The flange is useful for protecting the insert and the interfaces between the tube, insert and lockring from foreign matter and debris. In an alternate embodiment, the flange may be omitted, for example where the lockring is machined, so that the internal cylindrical surface 120 of the lockring extends completely to the top surface 114 of the lockring. Without the flange, a sealant (not shown) may be placed between the lockring and the tube so as to prevent entry of foreign matter and debris once the connection has been made.

Referring now also to FIG. 2, it can be seen that the lockring 100 engages the insert through the internal serrations 102 on the lockring and the external serrations 84 on the insert. The lockring is then used to tighten down the insert to the position shown in FIG. 2.

The frusto-conical portion 94 of the insert contacts the sloped surface on the flanged portion 46 of the sleeve, thereby bearing downward on the sleeve to maintain the lower end of the sleeve in the primary seal area. The insert 68 is threaded into the parent material to the required amount to adequately seal the tube 40 in the parent material. The lockring is then moved downwardly so that the external serrations 104 engage the internal serrations 74 formed in the parent material. In this configuration, the lockring prevents rotation of the insert and therefore prevents the tube and sleeve from backing out of the parent material. Therefore, the primary and only seal is maintained.

The process of forming the tubing connection will now be described. In the well known manner, the passageway 52 is formed in the parent material. A pilot tool is then used to form the second wall 54 and the second counterbore 64 in the parent material. The third counterbore 70 is also formed at the same time. The pilot tool is removed and a threading tap is used to form the threads 66. The cylindrical wall 72 is then prebroached to form the serrations 74 therein. The openings in the parent material are then cleaned and prepared as necessary. The tube and sleeve are prepared in a manner substantially identical to previous methods. The insert and lockring are obtained as a unit with the lockring captivated on the insert. The interference fit between the lockring and the insert is preferably such that the lockring does not slide axially relative to the insert during shipment and assembly. The lockring is axially positioned on the insert such that application of the required torque to the lockring in order to properly seal the tube in the primary seal area will bring the bottom rim 108 of the lockring close to the upper surface 56 of the parent material. The insert and lockring combination are passed over the tube so that the frusto-conical surface 94 in the insert can engage the flanged portion 46 on the sleeve.

The tube assembly is now placed in the opening formed in the parent material as described above. The tube and sleeve combination is inserted into the opening and the insert threaded into the parent material. The insert is rotated using a wrench engaging the hex points on the lockring. Turning the wrench therefore turns the insert. As the insert and lockring advance, the insert bears against the flanged portion and forces the tube and sleeve into the area defined by the second surface 54. As the rotation of the lockring and insert is continued, the seal between the parent material at the second surface 54 and the sleeve is formed. When the required torque is applied to the lockring, the required seal is formed between the second surface 54 and the lower end of the sleeve. Additionally, the crimp in the tubing is completely formed. At the same time, the bottom rim of the lockring is close to the top surface of the parent material The lockring is then rotated an appropriate amount until the external serrations on the lockring are aligned with the serrations 74 in the parent material. The lockring is then driven downward toward the parent material using a lockring drive tool so that the serrations on the lockring engage the serrations in the parent material. The lockring and insert are then fixed relative to the parent material so that the insert cannot back out of the parent material. Therefore, the sleeve is fixed relative to the second surface and the primary seal is maintained.

To remove the insert, a lockring removal tool engages the undercut 112 in the lockring to lift the lockring axially away from the insert and the parent material. When the external serrations 104 disengage from the serrations 74 in the parent material, a wrench can be used to engage the lockring and rotate the lockring and insert combination, backing the insert out of the parent material. The sleeve and tube can then be removed.

In the embodiment shown in FIG. 2, no fitting or B-nut is necessary to form the tube connection, the insert 68 serving as the connector to hold the tube in place. Only one seal is required and O-rings are optional. Additionally, lockwires are not required. The fewer number of parts facilitates manufacture and assembly of the connector elements and shipment to the final assembly point. It also reduces inventory. This also produces a weight reduction of approximately 60% compared to prior fittings. Furthermore, the profile of the resulting connection above the surface of the parent material is less than in prior fittings. For example, the connector stand-off height is approximately one-third of that for the fitting shown in FIG. 1. When the connection is disassembled, the sealing surface (i.e. the second wall 54) is not exposed to the surrounding environment in the manner that the sealing surface of the second primary seal 36 is exposed when the B-nut and tube are removed. The present connection produces a stronger connection and less susceptible to vibrational forces.

Torque will be used with the present insert as was used in setting the fitting in the prior art device. However, the thread dimensions and the axial location of the lockring on the insert are designed so that the required seal is automatically formed when the required torque has been achieved and so that the bottom rim of the lockring only approaches the top surface of the parent material but does not make contact.

In an alternate embodiment (not shown), the engagement between the lockring and the insert may be achieved through a combination of pins and slots. For example, the lockring may have a pair of diametrically opposed pins extending radially inwardly below the flange 116 on the lockring to engage diametrically opposed slots formed in the upper portion of the insert. Conversely, the pins may be formed in the insert to extend radially outwardly to engage corresponding slots formed in the lockring.

In a further embodiment, shown in FIG. 3, the primary seal is formed using a conventional dynamic beam tube seal. The lockring 100 is substantially identical in structure and function to that described with respect to FIGS. 2, 4 and 5, or it may be omitted entirely with appropriate modifications to the insert as described above with respect to FIG. 2 in the case where the lockring is omitted. The tube 40a is a dynamic beam seal tube. A sleeve 38 is not required. The base material 14 is formed using a modified porting tool to form the modified second surface 54a above the first wall 50 defining the passageway 52. The second wall 54a is a diverging frusto-conical portion diverging upward from the first wall 50 to the counterbore 64a. Otherwise, the formation of the opening in the parent material is substantially as described above with respect to FIG. 2.

The insert 68a is substantially similar to the insert 68 described above with respect to FIGS. 2, 6 and 7 except that the bottom rim 82a, which can be considered a second surface facing away from the insert, may include a more substantial flat surface for contacting the dynamic beam seal tube end. The bottom rim 82a contacts and bears against the seal tube end for creating and maintaining the primary seal at the second wall 54a.

The process of forming the connection shown in FIG. 3 is substantially the same as that described with respect to the embodiment shown in FIG. 2, except that the primary seal is formed directly between the second surface 54a and the tube end. A frusto-conical section is also included internally of the insert to clear the outside surface of the dynamic beam seal tube.

In a further embodiment of a hydraulic connector and lock combination 122 (FIG. 8), the fitting 12 constitutes the base element to which the hydraulic tube is mounted. The fitting is threaded into the parent material 14 and retained therein by the lockring 30 so that it is fixed relative to the parent material. The hydraulic tube 40 seats in and forms a seal with the upper portion of the fitting through action of the tubing sleeve 38 being pressed into the fitting by the connector, in the form of the B-nut 42. The B-nut is then in a position on the fitting to maintain the seal formed thereby. It should be understood that different configurations of fittings and tubing ends can be accommodated within the concept of the present invention. For example, the beam seal tube such as shown in FIG. 3 and an appropriate fitting can be substituted for the combination shown in FIG. 8.

Figure 10:
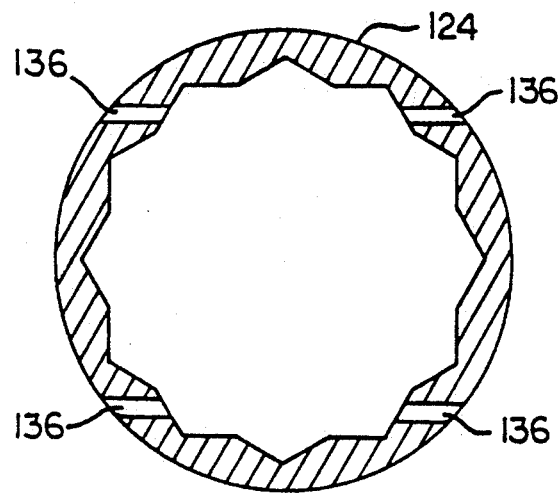
FIG. 10 is a transverse section of a sleeve for use with the combination of FIG. 8.

A sleeve 124 extends between the B-nut and the lockring 30 for preventing unthreading of the B-nut from the sealed position relative to the fitting. The sleeve can slide along the B-nut to engage one or more surfaces on the lockring 30 for preventing relative rotation therebetween. The configuration of a first or upper portion 126 on the sleeve is such that the inside walls thereof conform to and engage one or more corresponding surfaces on the B-nut 42 so that the sleeve cannot rotate relative to the B-nut. In the embodiment shown in FIG. 8, the B-nut is a 12-point B-nut and at least the upper portion 126 of the sleeve 124 has an inside surface which is configured to conform to a standard 12-point wrench surface (FIG. 10). In an alternative embodiment, the B-nut may include serrations by which it may be torqued to move the tube into the sealing position and by which the sleeve may engage the B-nut.

The sleeve includes a second or lower portion 128 which engages slidingly in an axial direction the external surface on the upper rim of the lockring 30 for preventing relative rotation between the B-nut and the fitting. In the preferred embodiment shown in FIG. 8, the upper portion of the lockring includes 12-point standard wrenching flats and the inside configuration of the sleeve conforms to the 12-point wrench standard along the entire length of the sleeve. Engagement of the sleeve with the upper rim of the lockring prevents rotation of the sleeve relative to the lockring, and therefore also prevents rotation of the B-nut relative to the lockring. It should be noted that the lockring also engages the fitting slidingly in an axial direction through the complimentary serrations between them to prevent relative rotation between the lockring and the fitting. The lockring may be considered to serve a dual function both of locking the fitting to the parent material and also of coupling the B-nut to the fitting, which is relatively fixed, through the intermediate vehicle of the sleeve. The engagement between the B-nut and the fitting therefore prevents the B-nut from backing off and unthreading from the fitting due to vibration, thermal expansion or other external forces. The proper seal is thereby maintained between the hydraulic tube 40 and the fitting 12.

Figure 11:
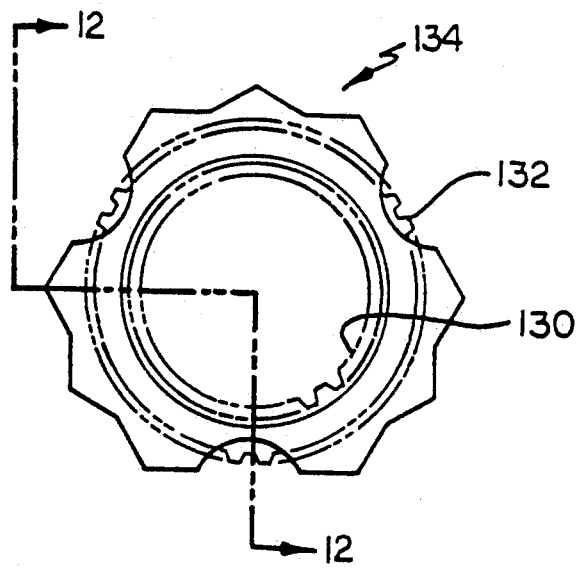
FIG. 11 is a plan view of a lockring for use with the present invention shown in FIG. 8.
Figure 12:
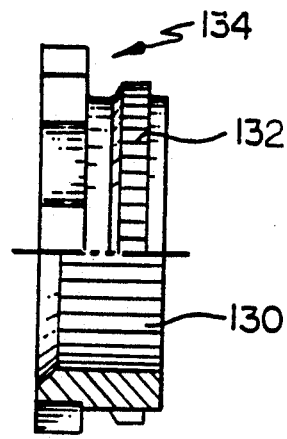
FIG. 12 is a side elevation and partial sectional view of the lockring shown in FIG. 11.

The lockring 134 as shown in FIG. 11, includes internal serrations 130 extending axially and formed substantially around the entire internal surface of the lockring in a manner similar to conventional lockrings. The lockring also includes external serrations 132 extending axially and formed around the external lower circumferential surface of the lockring to engage the parent material slidingly in an axial direction for preventing rotation relative to the parent material. The upper portion of the lockring includes a radially extending rim, the outside surface of which preferably has the shape of a 12-point wrench configuration with three equally spaced apart teeth of the 12 points removed and replaced by a concave surface so that the external serrations on the lower portion of the lockring can be viewed from above. With the configurations of the B-nut 42, sleeve 126 and lockring 30, as described above, the sleeve can slide easily along the B-nut and over and into engagement with the lockring to prevent relative rotation between the B-nut and the fitting.

Figure 8:
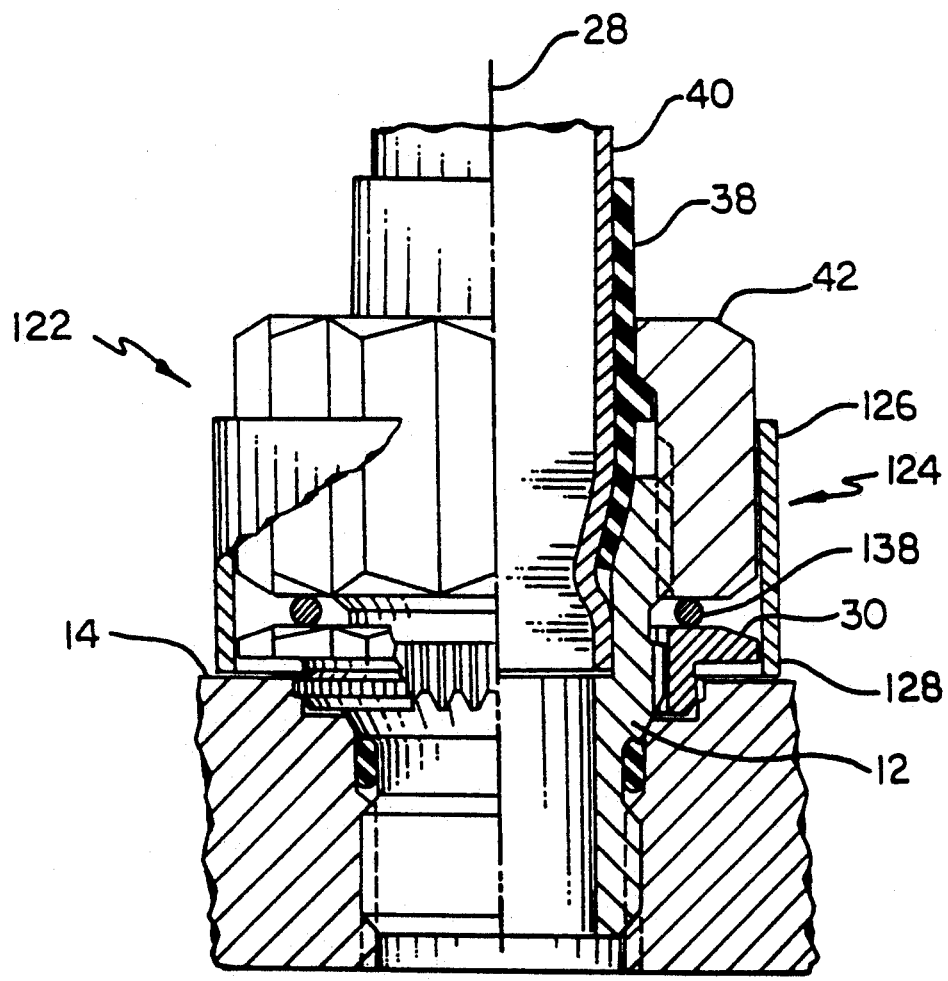
FIG. 8 is an elevation and partial longitudinal sectional view of a fluid connector with a sleeve engaging a connector and lockring according to an embodiment of the present invention.
Figure 9:
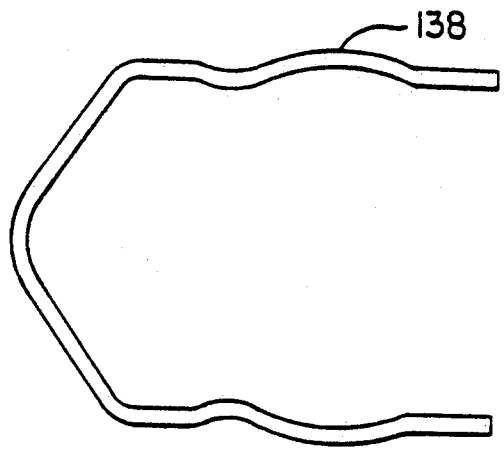
FIG. 9 is a clip retaining wire for use with a combination shown in FIG. 8.

The sleeve 124 in the embodiment shown in FIGS. 8 and 10 includes two pairs of parallel extending clip ring holes 136 drilled through the sides of the sleeve. Each pair of clip ring holes are aligned with one another and one pair of clip ring holes extends along a line parallel to a line passing through the other pair of holes. The two pairs of holes are preferably located on opposite sides of and equidistant from the center of the sleeve. The two pairs of holes are formed equidistant from one end of the sleeve so that the holes are at the same level above the parent material, when the sleeve is in place, as the space between the top of the lockring 30 and the bottom of the B-nut 42. The holes and their spacing from the end of the sleeve allow the legs of a clip ring 138 (FIG. 9) to pass through the respective holes in the sleeve, through the space between the bottom of the B-nut and the top of the lockring and around the sides of the fitting 12. The clip ring precludes axial movement of the sleeve while the clip ring is in place so that the sleeve and lockring prevent relative rotation between the B-nut and the fitting.

The hydraulic connector and lock combination shown in FIG. 8 provides for a positive lock between the B-nut and the fitting through the sleeve wherein the sleeve is held in position by the clip ring. (The fitting is held in place in the parent material by the lockring.) Therefore, the sleeve can neither rotate nor slide up off of the lockring under normal operating conditions. The combination is easily installed and disassembled using ordinary tools. The bottom of the B-nut provides a stop surface which prevents axial movement of the sleeve upward and out of engagement with the lockring. Appropriate sleeves can be easily designed and manufactured to accommodate the outer configurations of other hydraulic tubing connectors and fitting lockrings.

Figure 13:
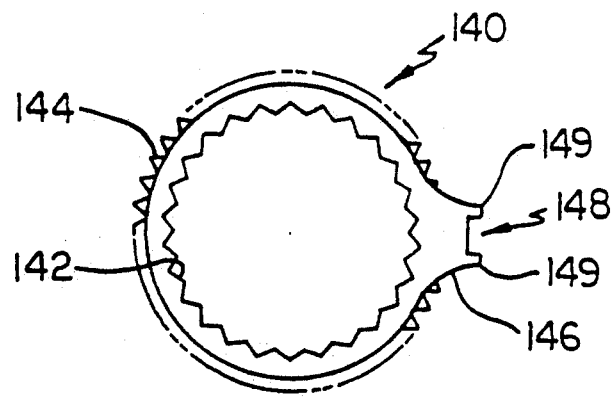
FIG. 13 is a further embodiment of a lockring having an eccentric lobe to be engaged by a portion of a sleeve.
Figure 14:
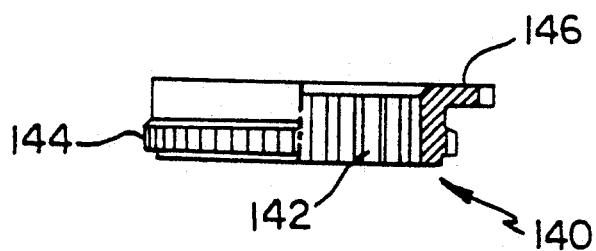
FIG. 14 is a side elevation and partial longitudinal section of the lockring of FIG. 13.

Considering FIGS. 13 and 14, a modified lockring 140 is shown having internal serrations 142 extending axially substantially the entire internal length of the lockring. A bevel extends around the upper inside rim of the lockring as shown in FIG. 14. External axially directed serrations 144 are spaced circumferentially about the outside surface of the lockring and extend only part way along the outside surface of the lockring for engaging the parent material. On the upper portion of the external surface of the lockring, an eccentric projection in the form of a lobe 146 extends radially from the lockring and includes a U-shaped opening 148 defined by a pair of spaced apart radially extending tips 149.

The lockring 140 engages the fitting and the parent material in a manner similar to that described above with respect to the combination shown in FIG. 8. However, with this lockring configuration, the internal and external serrations can be easily seen after the lockring is installed on the fitting and before the B-nut is threaded onto the fitting. The lobe 146 may be placed in more than one position around the circumference of the lockring.

A sleeve 148 for use with a lockring such as the lockring 140 as shown in FIGS. 13 and 14 includes a downwardly extending projection or tang 150 (FIGS. 15 and 16) for engaging the lobe 146 on the lockring. The tang is preferably a rectangular bar formed in or attached to one side of the sleeve 148. At the free end of the tang, a peaked, tangentially extending ridge 152 points inwardly from the inside edge of the tang and has a pair of sloping surfaces, one extending upward toward the rest of the tang, the other extending downwardly to the bottom of the tang.

Figure 15:
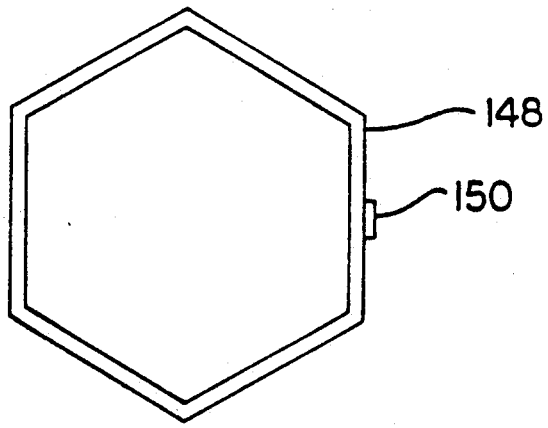
FIG. 15 is a plan view of a sleeve according to a further embodiment of the present invention.
Figure 16:
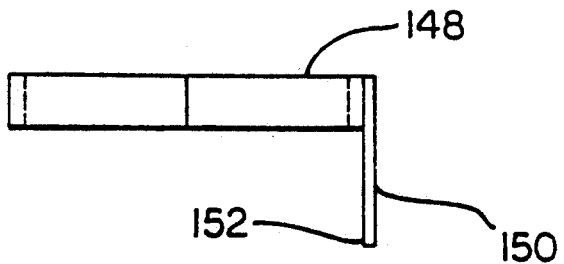
FIG. 16 is a longitudinal section of the sleeve of FIG. 15 showing a projection for engaging a lockring.

The enclosure of the sleeve 148 shown in FIGS. 15 and 16 is hexagonal in shape and extends axially a distance which is approximately one-third the overall length of the tang. The sleeve is configured to engage a hexagonal B-nut, but it should be understood that other suitable configurations for the enclosure are within the scope of the present invention to conform to surfaces on the corresponding tube connector, such as a sleeve having a 12-pointed internal surface or a sleeve having internal serrations to engage an externally serrated B-nut.

The tang is preferably located at a midpoint along one side of the hex-shaped sleeve. However, the tang can be positioned at other points on the sleeve as long as the tang can intersect a lobe on the lockring rotationally fixed relative to the fitting. More than one tang can be provided on the sleeve.

Figure 17:
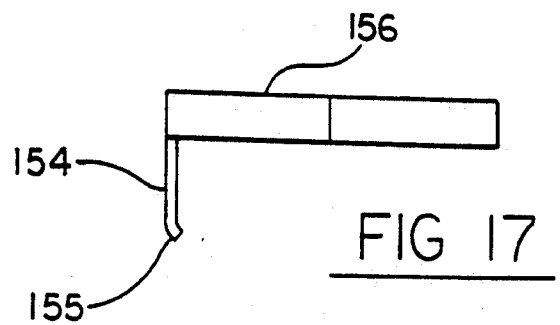
FIG. 17 is a side elevation of a sleeve showing a further embodiment of a tang according to the present invention.

In a form of a tang alternative to that shown in FIGS. 15 and 16, a tang 154 extends downward from and flush with the outside surface of one side of a hex-shaped sleeve 156 (FIG. 17). The tang is shaped as though it were originally a straight rectangular bar but with a free end bent inwardly so that the bottom tangentially extending edge 155 of the tang is approximately aligned with the inside upwardly extending edge of the rest of the tang.

In the form of the sleeve shown in FIGS. 16 and 17, the tang is designed to flex radially or outwardly on engagment and disengagment from the lockring, while still withstanding any torque which may develop when the B-nut tries to back off of the fitting. Preferably, the dimensions of the tang are such that it is wider than its thickness so that it can still flex but withstand the torque. The tang configuration can better withstand the torque developed during normal operating conditions than a sleeve design where a clip must be flexible enough to flex tangentially to engage the lockring while still preventing the B-nut from rotating.

Figure 18:
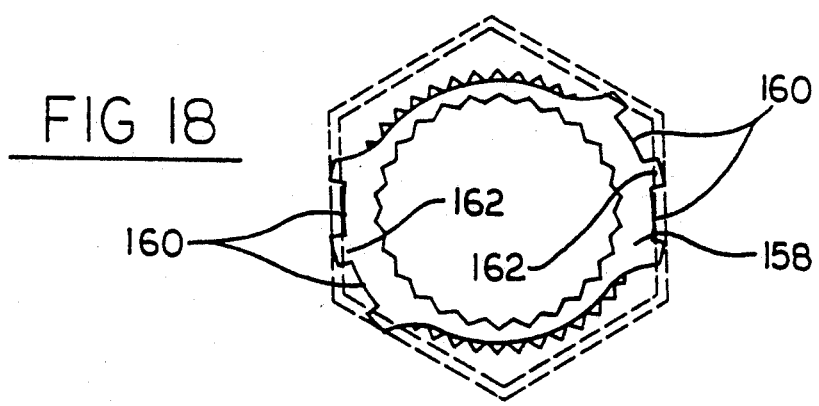
FIG. 18 is a top plan view of a lockring having multiple eccentric lobes according to a further embodiment of the present invention.
Figure 19:
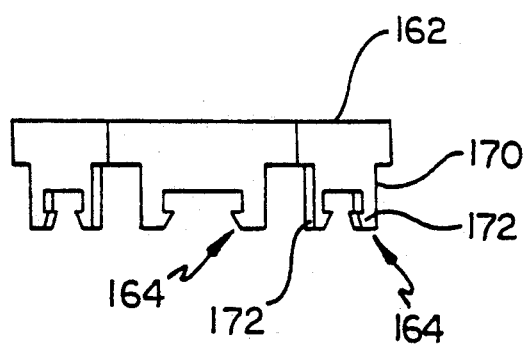
FIG. 19 is a side elevation view of a sleeve having multiple projections for engaging a lobe on a lockring according to a further embodiment of the present invention.

In a form of a lockring alternative to that described above with respect to FIGS. 13 and 14, a lockring 158 includes two pairs of side-by-side lobes 160, each pair of lobes having a common tip 162 (FIG. 18). Each tip may be pointed or squared off, or may be rounded.

Figure 20:
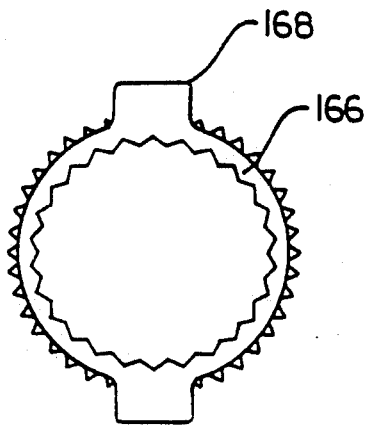
FIG. 20 is a top plan view of a lockring having eccentric lobes for engagement by projections on a sleeve according to a further embodiment of the present invention.
Figure 21:
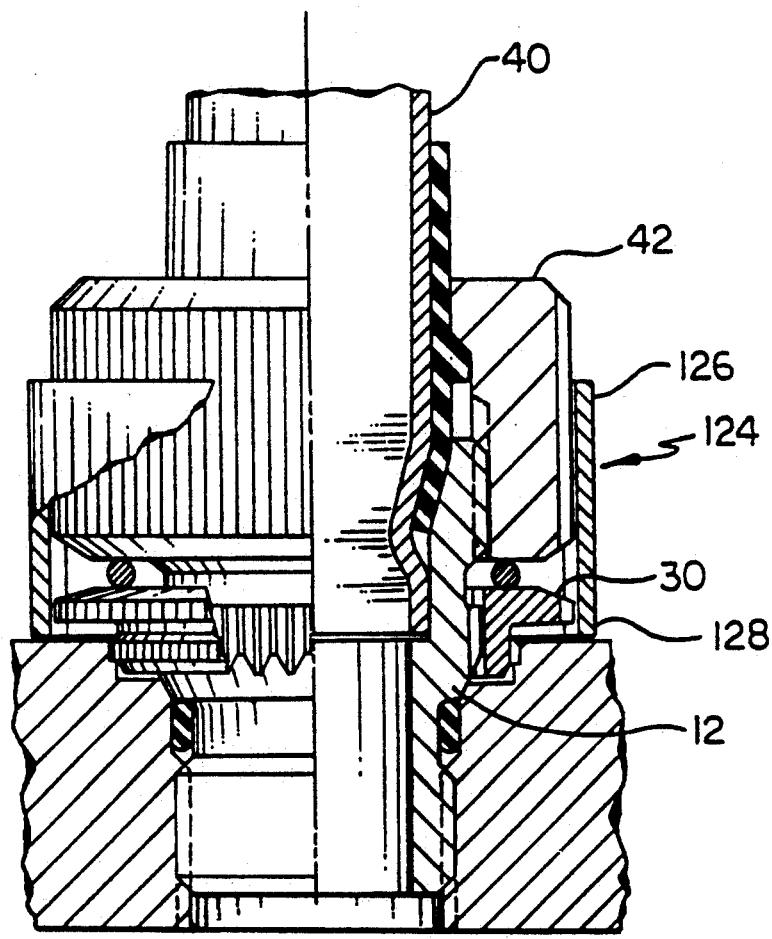
FIG. 21 is an elevation and partial longitudinal sectional view of a fluid connector with a serrated sleeve engaging a serrated lockring and connector.

In a further embodiment of the sleeve, a hexagonally shaped sleeve 162 is configured to engage a correspondingly shaped hexagonal B-nut (FIG. 20). Clip jaws 164 extend downwardly from respective sides of the sleeve a sufficient distance to contact a lockring 166 (FIG. 20) having one or more radially extending rectangular lobes 168. Each clip jaw includes a base 170 from which a pair of spaced apart jaws 172 extend downwardly. Each jaw includes a cam surface extending at an angle upwardly and inwardly toward the opposite jaw and terminating in a ledge which is formed to engage the under side of a respective lobe 168 on the lockring. The space between the ledge and the base 170 is sufficient to accommodate the thickness of the lobe 168.

The tubing connector and lock combination are assembled by installing the fitting and lockring in the conventional manner. The lockring used to fix the fitting to the parent material includes an upper rim which conforms to the particular type of sleeve used to engage the lockring. A sleeve is placed around the B-nut and passed over the B-nut and onto the tube to allow free operation of the B-nut. The B-nut and hydraulic tube are then joined to the fitting by threading the B-nut onto the fitting. The B-nut is tightened sufficiently to form the required seal and then positioned in a manner to allow the sleeve to properly engage the lockring according to the particular configuration of the sleeve and lockring. The sleeve and lockring engage the B-nut and fitting so that the B-nut cannot rotate relative to or back-off of the fitting. The seal between the hydraulic tube and the fitting can thereby be maintained. Where the sleeve includes a tang or clip, the sleeve is installed over the B-nut and lockring in a manner to properly engage the tang and lobe or other engagement means on the lockring.

It should be noted that the above embodiments are preferred but others are foreseeable. The described embodiments of the invention are only considered to be preferred and illustrative of the inventive concepts; the scope of the invention is not to be restricted to such embodiments. Various and numerous other arrangements may be devised by one skilled in the art without departing from the spirit and scope of the invention.

We claim:

1. A fluid connector and lock combination for connecting a tube to a base element, the combination comprising:

a relatively fixed threaded base element having a passageway for passing fluid;

threaded mounting means for surrounding the circumference of a portion of a tube and for mounting the tube to the relatively fixed, threaded base element through threaded engagement and wherein the mounting means maintains a seal between the tube and a corresponding surface in the base element when the mounting means is sufficiently threaded to a sealed position relative to the base element to prevent leakage of fluid across the seal; and preventing means extending between the mounting means and the base element for preventing unthreading of the mounting means from the sealed position relative to the base element wherein the preventing means includes a first portion which engages the mounting means and a second portion which engages slidingly in an axial direction the base element for preventing relative rotation between the mounting means and the base element;

wherein the base element includes a fitting threaded into a parent material and means for engaging a locking element wherein the locking element is in turn engaged with the parent material to prevent unthreading of the fitting;

the mounting means includes a connector having engagement means for engaging the first portion of the preventing means;

the engagement means includes hexagonally formed sides and wherein the locking element comprises a lockring; and the first portion of the preventing means includes a sleeve conforming substantially to the surface of the connector and the second portion of the preventing means engages at least a portion of the lockring.

2. The fluid connector and lock combination of claim 1 further comprising means extending under a portion of a lower surface of the connector and engaging the sleeve for substantially preventing axial movement of the sleeve.

3. The fluid connector and lock combination of claim 1 wherein the first and second portions are integral to form the sleeve and wherein the lockring has surfaces conforming to at least some of the sides of the sleeve and wherein the sleeve engages surfaces on the connector and surfaces on the lockring to substantially prevent rotation of the connector relative to the fitting.

4. The fluid connector and lock combination of claim 1 wherein the second portion includes a projection extending axially to engage the lockring.

5. The fluid connector and lock combination of claim 4 wherein the projection includes a tang and wherein the lockring includes a single lobe with a radially extending groove for accepting the tang.

6. The fluid connector and lock combination of claim 4 wherein the projection includes a tang and wherein the lockring includes multiple lobes having respective radially extending grooves for accepting a tang.

7. A fluid connector and lock combination for connecting a tube to a base element that includes a fitting that is threaded into a parent material and includes a passageway for passing fluid, the combination comprising:

a lockring that engages the parent material and the fitting through mutual serrations to fix the fitting relative to the parent material;

a B-nut that circumferentially mounts the tube to the fitting through threaded engagement with the fitting; and a sleeve that extends between the B-nut and the lockring to prevent unthreading of the B-nut from the fitting wherein the B-nut has surfaces which substantially conform to a first portion of the sleeve for engaging the first portion of the sleeve, and wherein the lockring has surfaces, at least some of which, substantially conform to a second portion of the sleeve for engaging the second portion of the sleeve, to prevent relative rotation between the B-nut and the fitting.

8. The fluid connector and lock combination of claim 7 wherein the B-nut includes serrations for engaging the sleeve and wherein the lockring includes serrations for engaging the sleeve.

9. A fluid connector and lock combination for connecting a tube to a base element, the combination comprising:

a relatively fixed, threaded base element including a fitting threaded into engagement with a parent material and having a passageway for passing fluid and a locking element having means for engaging both the fitting and the parent material for preventing unthreading of the fitting from the parent material;

threaded mounting means for surrounding the circumference of a portion of a tube and for mounting the tube to the relatively fixed, threaded base element through threaded engagement and wherein the mounting means maintains a seal between the tube and a corresponding surface of the base element when the mounting means is sufficiently threaded into engagement with the base element to a sealed position that prevents leakage of fluid across the seal; and preventing means extending between the mounting means and the base element for preventing unthreading of the mounting means from the sealed position relative to the base element, wherein the preventing means includes a first portion which engages the mounting means and a second portion which engages slidingly in an axial direction the base element for preventing relative rotation between the mounting means and the base element.

10. The fluid connector and lock combination of claim 9 wherein the mounting means includes a connector having engagement means for engaging the first portion of the preventing means.

11. The fluid connector and lock combination of claim 10 wherein the engagement means includes a multi-sided surface.

12. The fluid connector and lock combination of claim 10 wherein the engagement means includes hexagonal formed sides and wherein the locking element comprises a lockring.

13. A fluid connector and lock combination for connecting a tube to a base element, the combination comprising:
a relatively fixed, threaded base element including a fitting threaded into engagement with a parent material and having a passageway for passing fluid;
a lockring having means for engaging both the fitting and the parent material for preventing unthreading of the fitting from the parent material;
threaded mounting means including a connector having hexagonally formed sides, the threaded mounting means for surrounding the circumference of a portion of the tube and for mounting the tube to the relatively fixed base element through threaded engagement and wherein the mounting means maintains a seal between the tube and a corresponding surface in the base element when the mounting means is sufficiently threaded to a sealed position relative to the base element to prevent leakage of fluid across the seal; and
preventing means extending between the mounting means and the base element for preventing unthreading of the mounting means from the sealed position relative to the base element, wherein the preventing means includes a sleeve portion having a sleeve that substantially conforms to the hexagonally formed sides of the mounting means connector for engaging the connector and a locking element portion that slidingly engages in an axial direction the lockring for preventing relative rotation between the mounting means and the base element.

14. The fluid connector and lockring combination of claim 13 wherein the sleeve and lockring are separable from each other, wherein the sleeve includes a tang and wherein the lockring includes a lobe for engagement with the tang.

15. A fluid connector and lock combination for connecting a tube to a base element, the combination comprising:
a relatively fixed, threaded base element including a fitting threaded into engagement with a parent material and having a passageway for passing fluid and
a locking element having means for engaging both the fitting and the parent material for preventing unthreading of the fitting from the parent material;
a B-nut for circumferentially mounting the tube to the fitting through threaded engagement with the fitting;
preventing means extending between the B-nut and the base element for preventing unthreading of the B-nut from the base element wherein the preventing means includes a sleeve portion that engages the B-nut and prevents relative rotation between the B-nut and the preventing means and a locking element portion that slidingly engages the base element in an axial direction and prevents relative rotation between the preventing means and the base element.

16. The fluid connector and lock combination of claim 15 wherein the sleeve portion of the preventing means includes a sleeve that conforms substantially to a portion of the surface of the B-nut to prevent relative rotation between the preventing means and the B-nut, and wherein the surface of the B-nut comprises hex points.

17. The fluid connector and lock combination of claim 16 wherein the B-nut includes twelve points and wherein the sleeve includes an internal surface conforming to the twelve point B-nut.

18. A fluid connector and lock combination for connecting a tube to a base element that includes a fitting threaded into a parent material and a passageway for passing fluid, the combination comprising;
a locking element having means for engaging both the fitting and the parent material for preventing unthreading of the fitting from the parent material;
a B-nut for circumferentially mounting the tube to the fitting through threaded engagement with the fitting;
preventing means extending between the B-nut and the fitting for preventing unthreading of the B-nut from the fitting wherein the preventing means includes a sleeve portion having a shape conforming to the shape of the B-nut that engages the B-nut and prevents relative rotation between the B-nut and the preventing means and a locking element portion that slidingly engages the locking element in an axial direction and prevents relative rotation between the preventing means and the fitting.

19. The fluid connector and lock combination of claim 18 wherein the sleeve includes a tang that engages an edge of the B-nut and that maintains the B-nut fixed relative to the fitting.

20. The fluid connector and lock combination of claim 19 wherein the locking element includes a lockring that is angularly fixed relative to the fitting and includes a lobe having an edge that engages the tang and prevents relative movement between the B-nut and the preventing means.

* * * * *